US007234045B2

(12) United States Patent
Henry et al.

(10) Patent No.: US 7,234,045 B2
(45) Date of Patent: *Jun. 19, 2007

(54) APPARATUS AND METHOD FOR HANDLING BTAC BRANCHES THAT WRAP ACROSS INSTRUCTION CACHE LINES

(75) Inventors: G. Glenn Henry, Austin, TX (US); Brent Bean, Austin, TX (US); Thomas C. McDonald, Austin, TX (US)

(73) Assignee: IP-First, LLC, Fremont, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 11/208,302

(22) Filed: Aug. 19, 2005

(65) Prior Publication Data

US 2006/0010310 A1   Jan. 12, 2006

Related U.S. Application Data

(63) Continuation-in-part of application No. 10/920,120, filed on Aug. 17, 2004, now Pat. No. 7,159,098, which is a continuation of application No. 09/898,832, filed on Jul. 3, 2001, now Pat. No. 6,823,444, application No. 11/208,302, which is a continuation of application No. 09/906,381, filed on Jul. 16, 2001, and a continuation-in-part of application No. 09/898,583, filed on Jul. 3, 2001, now Pat. No. 7,162,619.

(51) Int. Cl.
  *G06F 9/32* (2006.01)
(52) U.S. Cl. .................. 712/237; 712/204
(58) Field of Classification Search ............ 712/237, 712/204, 201; 711/201
  See application file for complete search history.

(56) References Cited

U.S. PATENT DOCUMENTS

| 4,181,942 A | 1/1980 | Forster et al. |
| 4,200,927 A | 4/1980 | Hughes et al. |
| 4,860,197 A | 8/1989 | Langendorf et al. |
| 5,142,634 A | 8/1992 | Fite et al. |

(Continued)

OTHER PUBLICATIONS

*Microprocessor Report.* vol. 9. No. 2. Feb. 16, 1995. p. 5.

(Continued)

*Primary Examiner*—Eddie Chan
*Assistant Examiner*—Aimee Li
(74) *Attorney, Agent, or Firm*—E. Alan Davis; James W. Huffman

(57) ABSTRACT

A branch control apparatus in a microprocessor. The apparatus includes a branch target address cache (BTAC) that caches indications of whether a branch instruction wraps across two cache lines. When an instruction cache fetch address of a first cache line containing the first part of the branch instruction hits in the BTAC, the BTAC outputs a target address of the branch instruction and indicates the wrap condition. The target address is stored in a register. The next sequential fetch address selects a second cache line containing the second part of the branch instruction. After the two cache lines containing the branch instruction are fetched, the target address from the register is provided to the instruction cache in order to fetch a third cache line containing a target instruction of the branch. The three cache lines are stored in order in an instruction buffer for decoding.

20 Claims, 9 Drawing Sheets

Branch Control Apparatus

U.S. PATENT DOCUMENTS

| | | | |
|---|---|---|---|
| 5,163,140 A | 11/1992 | Stiles et al. | |
| 5,313,634 A | 5/1994 | Eickemeyer | |
| 5,353,421 A | 10/1994 | Emma et al. | |
| 5,355,459 A | 10/1994 | Matsuo et al. | |
| 5,394,530 A | 2/1995 | Kitta | |
| 5,404,467 A | 4/1995 | Saba et al. | |
| 5,434,985 A | 7/1995 | Emma et al. | |
| 5,513,330 A | 4/1996 | Stiles | |
| 5,530,825 A | 6/1996 | Black et al. | |
| 5,553,246 A | 9/1996 | Suzuki | |
| 5,604,877 A | 2/1997 | Hoyt et al. | |
| 5,623,614 A | 4/1997 | Van Dyke et al. | |
| 5,623,615 A | 4/1997 | Salem et al. | |
| 5,634,103 A | 5/1997 | Dietz et al. | |
| 5,687,349 A | 11/1997 | McGarity | |
| 5,687,360 A | 11/1997 | Chang | |
| 5,706,491 A | 1/1998 | McMahan | |
| 5,721,855 A | 2/1998 | Hinton et al. | |
| 5,734,881 A | 3/1998 | White et al. | |
| 5,752,069 A | 5/1998 | Roberts et al. | |
| 5,761,723 A | 6/1998 | Black et al. | |
| 5,768,576 A | 6/1998 | Hoyt et al. | |
| 5,805,877 A | 9/1998 | Black et al. | |
| 5,812,839 A | 9/1998 | Hoyt et al. | |
| 5,828,901 A | 10/1998 | O'Toole et al. | |
| 5,832,289 A | 11/1998 | Shaw et al. | |
| 5,850,532 A | 12/1998 | Narayan et al. | |
| 5,850,543 A | 12/1998 | Shiell et al. | |
| 5,864,707 A | 1/1999 | Tran et al. | |
| 5,867,701 A | 2/1999 | Brown et al. | |
| 5,881,260 A | 3/1999 | Raje et al. | |
| 5,881,265 A | 3/1999 | McFarland et al. | |
| 5,931,944 A | 8/1999 | Ginosar et al. | |
| 5,948,100 A | 9/1999 | Hsu et al. | |
| 5,961,629 A | 10/1999 | Nguyen et al. | |
| 5,964,868 A | 10/1999 | Gochman et al. | |
| 5,968,169 A | 10/1999 | Pickett | |
| 5,974,543 A | 10/1999 | Hilgendorf et al. | |
| 5,978,909 A | 11/1999 | Lempel | |
| 6,035,391 A | 3/2000 | Isaman | |
| 6,041,405 A | 3/2000 | Green | |
| 6,044,459 A | 3/2000 | Bae et al. | |
| 6,081,884 A | 6/2000 | Miller | |
| 6,085,311 A | 7/2000 | Narayan et al. | |
| 6,088,793 A | 7/2000 | Liu et al. | |
| 6,101,595 A | 8/2000 | Pickett et al. | |
| 6,108,773 A | 8/2000 | Col et al. | |
| 6,122,729 A | 9/2000 | Tran | |
| 6,134,654 A | 10/2000 | Patel et al. | |
| 6,151,671 A | 11/2000 | D'Sa et al. | |
| 6,157,988 A | 12/2000 | Dowling | |
| 6,170,054 B1 | 1/2001 | Poplingher | |
| 6,175,897 B1 | 1/2001 | Ryan et al. | |
| 6,185,676 B1 | 2/2001 | Poplingher et al. | |
| 6,233,676 B1 | 5/2001 | Henry et al. | |
| 6,250,821 B1 | 6/2001 | Schwendinger | |
| 6,256,727 B1 | 7/2001 | McDonald | |
| 6,260,138 B1 | 7/2001 | Harris | |
| 6,279,105 B1 | 8/2001 | Konigsburg et al. | |
| 6,279,106 B1 | 8/2001 | Roberts | |
| 6,308,259 B1 | 10/2001 | Witt | |
| 6,314,514 B1 | 11/2001 | McDonald | |
| 6,321,321 B1 | 11/2001 | Johnson | |
| 6,351,796 B1 | 2/2002 | McCormick et al. | |
| 6,374,350 B1 | 4/2002 | D'Sa et al. | |
| 6,457,120 B1 | 9/2002 | Sinharoy | |
| 6,502,185 B1 | 12/2002 | Keller et al. | |
| 6,560,696 B1 | 5/2003 | Hummel et al. | |
| 6,601,161 B2 | 7/2003 | Rappoport et al. | |
| 6,647,467 B1 | 11/2003 | Dowling | |
| 6,725,357 B1 | 4/2004 | Cousin | |
| 6,748,441 B1 | 6/2004 | Gemmell | |
| 6,754,808 B1 | 6/2004 | Roth et al. | |
| 6,823,444 B1 | 11/2004 | Henry et al. | |
| 6,886,093 B2 | 4/2005 | Henry | |
| 6,895,498 B2 | 5/2005 | McDonald et al. | |
| 6,898,699 B2 | 5/2005 | Jourdan et al. | |
| 6,968,444 B1 | 11/2005 | Kroesche et al. | |
| 2002/0188833 A1 | 12/2002 | Henry et al. | |
| 2002/0194460 A1 | 12/2002 | Henry et al. | |
| 2002/0194461 A1 | 12/2002 | Henry et al. | |
| 2002/0194464 A1 | 12/2002 | Henry et al. | |
| 2004/0030866 A1 | 2/2004 | McDonald | |
| 2004/0139281 A1 | 7/2004 | McDonald | |
| 2004/0139292 A1 | 7/2004 | McDonald | |
| 2004/0139301 A1 | 7/2004 | McDonald | |
| 2004/0143709 A1 | 7/2004 | McDonald | |
| 2004/0143727 A1 | 7/2004 | McDonald | |
| 2005/0044343 A1 | 2/2005 | Henry et al. | |
| 2005/0076193 A1 | 4/2005 | Henry et al. | |
| 2005/0114636 A1 | 5/2005 | McDonald et al. | |
| 2005/0132175 A1 | 6/2005 | Henry et al. | |
| 2005/0198479 A1 | 9/2005 | Bean et al. | |

OTHER PUBLICATIONS

*Microprocessor Report*. Aug. 23, 1999. p. 7.

Yeh et al. *Alternative Implementation of Two-Level Adaptive Branch Prediction*. 19th Annual International Symposium on Computer Architecture. pp. 124-134. May 19-21, 1992. Gold Coast, Australia.

Chang et al. *Alternative Implementations of Hybrid Branch Predictors*. Proceedings of MICRO-28. 1995. IEEE.

Mc Farling, Scott. *WRL Technical Note TN-36*. Combining Branch Predictors. Jun. 1993. Western Research Laboratory, 250 University Ave., Palo Alto, CA 94301.

Bray et al. *Strategies For Branch Target Buffers*. Technical Report No. CSL-TR-91-480. Jun. 1991.

Sakamoto et al. *Microarchitecture Support for Reducing Branch Penalty in a Superscaler Processor*. pp. 208-216. Mittsubishi Electric Corp. 4-1 Mizuhara, Itami, Hyogo 664. Japan, 1996. IEEE.

IEEE 100, The Authoritative Dictionary of IEEE Standard Terms, Seventh Edition. The Institute of Electrical Engineering, Inc. New York: Standards Information Network IEEE Press p. 135.

Online Computing Dictionary. http://instantweb.com/d/dictionary/foldoc.cgi?query=btb May 5, 1995. Branch Target Buffer.

The D Latch, Play-Hookey Web Page, Oct. 10, 1999.

Patterson et al. "Computer Organization & Design: The Hardware/Software Interface." Morgan Kaufmann Publishers, Inc. San Francisco, CA. 1998 p. 469.

Jimenez et al. "The Impact of Delay on the Design of Branch Predictors." 2000.

Eberly et al. "The Correlation Branch Target Address Cache" May 1996.

Patterson et al. "Computer Organization & Design: The Hardware/Software Interface." Morgan Kaufmann Publishers, Inc. San Francisco, CA. 1998 p. 453-455.

IBM Technical Disclosure Bulletin NN9204269, "Return Address Stack Cache." Apr. 1992, pp. 269-271.

*Branching Operation*

Branch Operation Example 1:
Non-Wrapping BTAC Branch, Cache Line A Fills Instruction Buffer Branch Operation Example 2:
Wrapping BTAC Branch, Cache Line B Misses in I-Cache Branch Operation Example 3:
Wrapping BTAC Branch, Cache Line A Fill Instruction Buffer

*Branching Operation (Alternate Embodiment)*

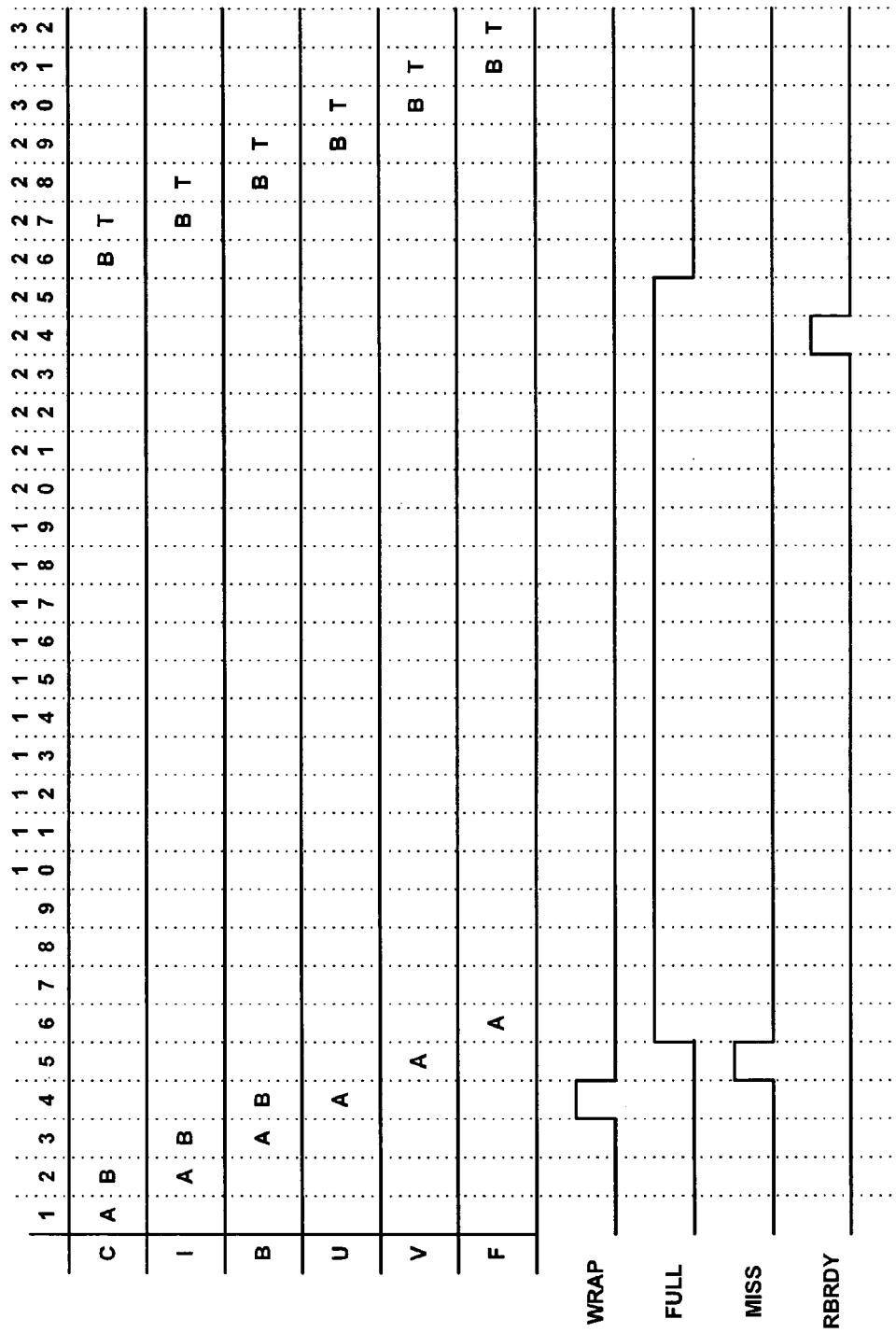

APPARATUS AND METHOD FOR HANDLING BTAC BRANCHES THAT WRAP ACROSS INSTRUCTION CACHE LINES

CROSS-REFERENCE TO RELATED APPLICATIONS

This application is a continuation of application Ser. No. 09/906,381, filed Jul. 16, 2001. This application is a continuation-in-part of application Ser. No. 10/920,120, filed Aug. 17, 2004, U.S. Pat. No. 7,159,098 issued Jan. 2, 2007, which is a continuation of application Ser. No. 09/898,832, filed Jul. 3, 2001, U.S. Pat. No. 6,823,444 issued Nov. 23, 2004. This application is a continuation-in-part of application Ser. No. 09/898,583, filed Jul. 3, 2001, U.S. Pat. No. 7,162,619 issued Jan. 9, 2007.

FIELD OF THE INVENTION

This invention relates in general to the field of branch target address caching in pipelined microprocessors, and more particularly to branch instructions that wrap across instruction cache lines.

BACKGROUND OF THE INVENTION

Pipelined microprocessors include multiple pipeline stages, each stage performing a different function necessary in the execution of program instructions. Typical pipeline stage functions are instruction fetch, instruction decode, instruction execution, memory access, and result write-back.

The instruction fetch stage fetches the next instruction in the currently executing program. The next instruction is typically the instruction with the next sequential memory address. However, in the case of a taken branch instruction, the next instruction is the instruction at the memory address specified by the branch instruction, commonly referred to as the branch target address. The instruction fetch stage fetches instructions from an instruction cache. If the instructions are not present in the instruction cache, they are fetched into the instruction cache from another memory higher up in the memory hierarchy of the machine, such as from a higher-level cache or from system memory. The fetched instructions are provided to the instruction decode stage.

The instruction decode stage includes instruction decode logic that decodes the instruction bytes received from the instruction fetch stage. In the case of a processor that supports variable length instructions, such as an x86 architecture processor, one function of the instruction decode stage is to format a stream of instruction bytes into separate instructions. Formatting a stream of instructions includes determining the length of each instruction. That is, instruction format logic receives a stream of undifferentiated instruction bytes from the instruction fetch stage and formats, or parses, the stream of instruction bytes into individual groups of bytes. Each group of bytes is an instruction, and the instructions make up the program being executed by the processor. The instruction decode stage may also include translating macro-instructions, such as x86 instructions, into micro-instructions that are executable by the remainder of the pipeline.

The execution stage includes execution logic that executes the formatted and decoded instructions received from the instruction decode stage. The execution logic operates on data retrieved from a register set of the processor and/or from memory. The write-back stage stores the results produced by the execution logic into the processor register set.

An important aspect of pipelined processor performance is keeping each stage of the processor busy performing the function it was designed to perform. In particular, if the instruction fetch stage does not provide instruction bytes when the instruction decode stage is ready to decode the next instruction, then, processor performance will suffer. In order to prevent starvation of the instruction decode stage, an instruction buffer is commonly placed between the instruction cache and instruction format logic. The instruction fetch stage attempts to keep several instructions worth of instruction bytes in the instruction buffer so that the instruction decode stage will have instruction bytes to decode, rather than starving.

Typically, an instruction cache provides a cache line of instruction bytes, typically 16 or 32 bytes, at a time. The instruction fetch stage fetches one or more cache lines of instruction bytes from the instruction cache and stores the cache lines into the instruction buffer. When the instruction decode stage is ready to decode an instruction, it accesses the instruction bytes in the instruction buffer, rather than having to wait on the instruction cache.

The instruction cache provides a cache line of instruction bytes selected by a fetch address supplied to the instruction cache by the instruction fetch stage. During normal program operation, the fetch address is simply incremented by the size of a cache line since it is anticipated that program instructions are executed sequentially. The incremented fetch address is referred to as the next sequential fetch address. However, if a branch instruction is decoded by the instruction decode logic and the branch instruction is taken (or predicted taken), then the fetch address is updated to the target address of the branch instruction (modulo the cache line size), rather than being updated to the next sequential fetch address.

However, by the time the fetch address is updated to the branch target address, the instruction buffer has likely been populated with instruction bytes of the next sequential instructions after the branch instruction. Because a branch has occurred, the instructions after the branch instruction must not be decoded and executed. That is, proper program execution requires the instructions at the branch target address to be executed, not the next sequential instructions after the branch instruction. The instruction bytes in the instruction buffer were erroneously pre-fetched in anticipation of the more typical case of sequential instruction flow in the program. To remedy this error, the processor must flush all instruction bytes behind the branch instruction, which includes the instruction bytes in the instruction buffer.

Flushing the instruction buffer upon a taken branch instruction is costly since now the instruction decode stage will be starved until the instruction buffer is re-populated from the instruction cache. One solution to this problem is to branch prior to decoding the branch instruction. This may be accomplished by employing a branch target address cache (BTAC) that caches fetch addresses of instruction cache lines containing previously executed branch instructions and their associated target addresses.

The instruction cache fetch address is applied to the BTAC essentially in parallel with the application of the fetch address to the instruction cache. In the case of an instruction cache fetch address of a cache line containing a branch instruction, the cache line is provided to the instruction buffer. In addition, if the fetch address hits in the BTAC, the BTAC provides an associated branch target address. If the branch instruction hitting in the BTAC is predicted taken, the instruction cache fetch address is updated to the target address provided by the BTAC. Consequently, the cache line containing the target instructions, i.e., the instructions at the target address, will be stored in the instruction buffer behind the cache line containing the branch instruction.

However, the situation is complicated by the fact that in processors that execute variable length instructions, the branch instruction may wrap across two cache lines. That is, the first part of the branch instruction bytes may be contained in a first cache line, and the second part of the branch instruction bytes may be contained in the next cache line. Therefore, the next sequential fetch address must be applied to the instruction cache rather than the target address in order to obtain the cache line with the second part of the branch instruction. Then the target address must somehow be applied to the instruction cache to obtain the target instructions.

Therefore, what is needed is a branch control apparatus that provides proper program operation in the case of wrapping BTAC branches.

SUMMARY

The present invention provides a branch control apparatus in a pipelined processor that provides proper program operation in the case of wrapping BTAC branches. Accordingly, in attainment of the aforementioned object, it is a feature of the present invention to provide a branch control apparatus in a microprocessor having an instruction cache, coupled to an address bus, for providing cache lines to an instruction buffer. The apparatus includes a target address of a branch instruction. A branch target address cache (BTAC) provides the target address. The apparatus also includes a wrap signal, provided by the BTAC, which indicates whether the branch instruction wraps across first and second cache lines. The apparatus also includes an address register, coupled to the BTAC, that stores the target address. If the wrap signal indicates the branch instruction wraps across the first and second cache lines, the address register provides the target address on the address bus to the instruction cache to select a third cache line. The third cache line contains a target instruction of the branch instruction.

In another aspect, it is a feature of the present invention to provide a pipelined microprocessor. The microprocessor includes an instruction cache, coupled to an address bus that receives a first fetch address for selecting a first cache line. The microprocessor also includes a branch target address cache (BTAC), coupled to the address bus, which provides a wrap indicator for indicating whether a branch instruction wraps beyond the first cache line. The microprocessor also includes an address register, coupled to the BTAC, that stores a target address of the branch instruction. The target address is provided by the BTAC. The microprocessor also includes a multiplexer, coupled to the BTAC, which selects a second fetch address for provision on the address bus if the wrap indicator is true. The second fetch address selects a second cache line containing a portion of the branch instruction wrapping beyond the first cache line. The multiplexer selects the target address from the address register for provision on the address bus after selecting the second fetch address for provision on the address bus.

In another aspect, it is a feature of the present invention to provide a branch control apparatus in a microprocessor. The branch control apparatus includes a branch target address cache (BTAC) that caches indications of whether previously executed branch instructions wrap across two cache lines. The branch control apparatus also includes a register, coupled to the BTAC, that receives from the BTAC a target address of one of the previously executed instructions. The branch control apparatus also includes control logic, coupled to the BTAC, that receives one of the indications. If the one of the indications indicates the one of the previously executed branch instructions wraps across two cache lines, the control logic causes the microprocessor to branch to the target address, after causing the two cache lines containing the one of the previously executed branch instructions to be fetched.

In another aspect, it is a feature of the present invention to provide a microprocessor branch control apparatus. The branch control apparatus includes an incrementer, coupled to an instruction cache address bus, that provides a first fetch address on the address bus. The first fetch address selects a first cache line containing a first portion of a branch instruction. The branch control apparatus also includes a branch target address cache (BTAC), coupled to the address bus, which provides a target address of the branch instruction in response to the first fetch address. The branch control apparatus also includes an address register, coupled to the BTAC, that stores the target address if the BTAC indicates the branch instruction wraps beyond the first cache line. The incrementer provides a second fetch address on the address bus. The second fetch address selects a second cache line containing a second portion of the branch instruction. The address register provides the target address on the address bus. The target address selects a third cache line containing a target instruction of the branch instruction.

In another aspect, it is a feature of the present invention to provide a method for performing branches in a microprocessor with an instruction cache. The method includes applying a first fetch address to the instruction cache for selecting a first cache line containing at least a portion of a branch instruction, providing a target address of the branch instruction in response to the first fetch address, and determining whether the branch instruction wraps beyond the first cache line. The method also includes storing the target address in a register if the branch instruction wraps beyond the first cache line, applying a second fetch address to the instruction cache, if the branch instruction wraps beyond the first cache line, for selecting a second cache line containing a remainder of the branch instruction, and providing the target address from the register to the instruction cache for selecting a third cache line containing a target instruction of the branch instruction.

An advantage of the present invention is that it potentially improves branch performance in a pipelined microprocessor that uses a BTAC by enabling the processor to take a BTAC branch even if the branch wraps across multiple cache lines. The invention enables wrapped branching even in processors that do not have stalling circuitry in the pre-decode stages of the processor, thereby avoiding the branch penalty associated with mispredicting the branch as not taken and subsequently correcting for the misprediction. The avoidance of the branch penalty is particularly advantageous in a processor having a large number of pipeline stages.

Other features and advantages of the present invention will become apparent upon study of the remaining portions of the specification and drawings.

BRIEF DESCRIPTION OF THE DRAWINGS

FIG. 9 is a timing diagram illustrating an example of operation of the branch control apparatus of FIG. 2 according to the flowchart of FIG. 8 according to the present invention.

DETAILED DESCRIPTION

Figure 1:
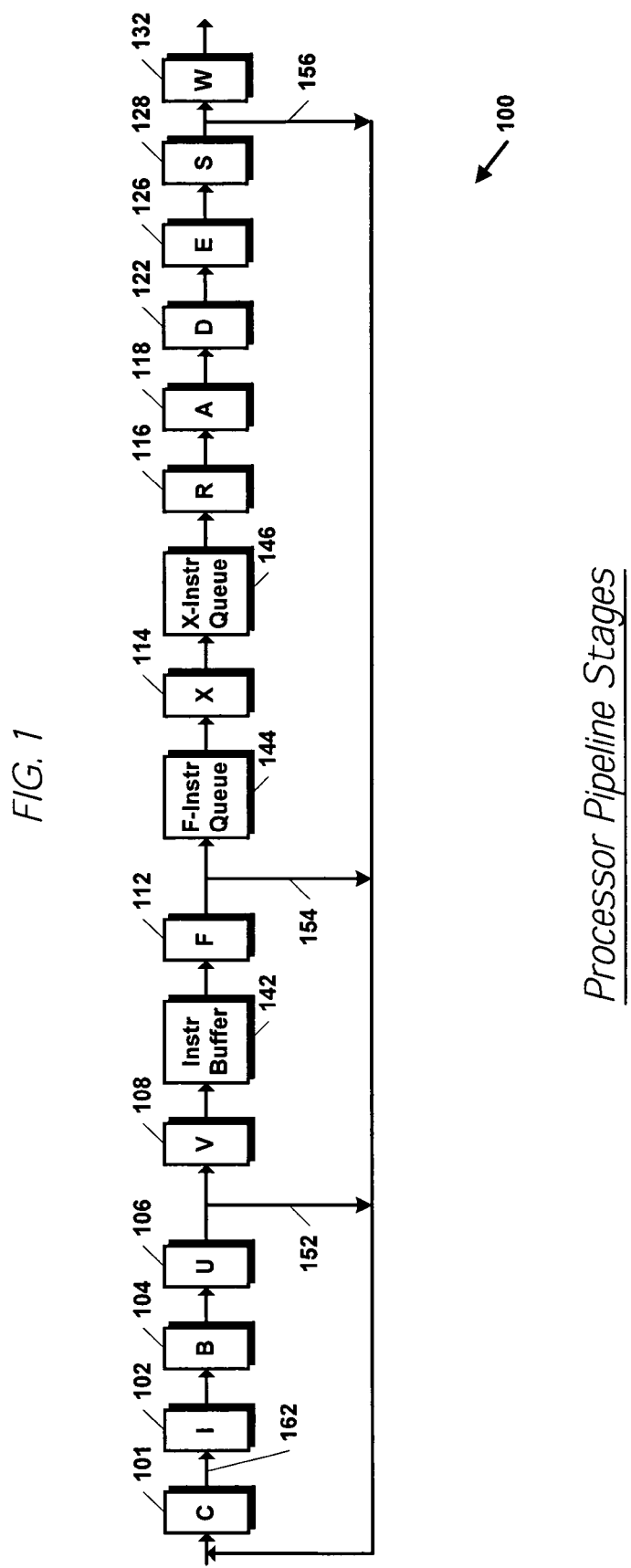
FIG. 1 is a block diagram illustrating a pipelined microprocessor according to the present invention.

Referring now to FIG. 1, a block diagram illustrating a pipelined microprocessor 100 according to the present invention is shown. The processor pipeline 100 includes a plurality of stages 101 through 132. In one embodiment, the microprocessor 100 comprises an x86 architecture processor.

The first stage of the microprocessor 100 is the C-stage 101, or instruction cache address generation stage. The C-stage 101 generates a fetch address 162 that selects a cache line in an instruction cache 202 (see FIG. 2).

The next stage is the I-stage 102, or instruction fetch stage. The I-stage 102 is the stage where the processor 100 provides the fetch address 162 to the instruction cache 202 (see FIG. 2) in order to fetch instructions for the processor 100 to execute. The instruction cache 202 is described in more detail with respect to FIG. 2. In one embodiment, the instruction cache 202 is a two-cycle cache. A B-stage 104 is the second stage of the instruction cache 202 access. The instruction cache 202 provides its data to a U-stage 106, where the data is latched in. The U-stage 106 provides the instruction cache data to a V-stage 108.

In the present invention, the processor 100 further comprises a speculative branch target address cache (BTAC) 216 (see FIG. 2), described in detail below. The BTAC 216 is accessed in parallel with the instruction cache 202 in the I-stage 102 using the instruction cache 202 fetch address 162, thereby enabling relatively fast branching to reduce branch penalty. The BTAC 216 provides a speculative branch target address 152 that is provided to the I-stage 102. The processor 100 selectively chooses the target address 152 as the instruction cache 202 fetch address to achieve a branch to the speculative target address 152.

Advantageously, as may be seen from FIG. 1, the branch target address 152 supplied by the branch target address cache 216 in the U-stage 106 enables the processor 100 to branch relatively early in the pipeline 100, creating only a two-cycle instruction bubble. That is, if the processor 100 branches to the speculative target address 152, only two stages worth of instructions must be flushed. In other words, within two cycles, the target instructions of the branch will be available at the U-stage 106 in the typical case, i.e., if the target instructions are present in the instruction cache 202.

Advantageously, in most cases, the two-cycle bubble is small enough that an instruction buffer 142, F-stage instruction queue 144 and/or X-stage instruction queue 146, described below, may absorb the bubble. Consequently, in many cases, the speculative BTAC 216 enables the processor 100 to achieve zero-penalty branches.

The V-stage 108 is the stage in which instructions are written to the instruction buffer 142. The instruction buffer 142 buffers instructions for provision to an F-stage 112. The instruction buffer 142 comprises a plurality of stages, or registers, for storing instruction bytes received from the instruction cache 202. In one embodiment, the instruction buffer 142 is capable of buffering 128 instruction bytes. In one embodiment, the instruction buffer 142 is similar to the instruction buffer described in the U.S. patent application Ser. No. 09/898,832, filed Jul. 3, 2001, U.S. Pat. No. 6,823,444 issued Nov. 23, 2004, incorporated by reference above. The V-stage 108 also includes decode logic for providing information about the instruction bytes to the instruction buffer 142, such as x86 prefix and mod R/M information, and whether an instruction byte is a branch opcode value.

The F-stage 112, or instruction format stage 112, includes instruction format logic 214 (see FIG. 2) for formatting instructions. Preferably, the processor 100 is an x86 processor, which allows for variable length instructions in its instruction set. The instruction format logic 214 receives a stream of instruction bytes from the instruction buffer 142 and parses the stream into discrete groups of bytes constituting an x86 instruction, and in particular providing the length of each instruction.

The F-stage 112 also includes branch instruction target address calculation logic for generating a non-speculative branch target address 154 based on an instruction decode, rather than based speculatively on the instruction cache 202 fetch address, like the BTAC 216 in the I-stage 102. The F-stage 112 non-speculative address 154 is provided to the I-stage 102. The processor 100 selectively chooses the F-stage 112 non-speculative address 154 as the instruction cache 202 fetch address to achieve a branch to the non-speculative address 154.

An F-stage instruction queue 144 receives the formatted instructions. Formatted instructions are provided by the F-stage instruction queue 144 to an instruction translator in the X-stage 114.

The X-stage 114, or translation stage 114, instruction translator translates x86 macroinstructions into microinstructions that are executable by the remainder of the pipeline stages. The translated microinstructions are provided by the X-stage 114 to an X-stage instruction queue 146.

The X-stage instruction queue 146 provides translated microinstructions to an R-stage 116, or register stage 116. The R-stage 116 includes the user-visible x86 register set, in addition to other non-user-visible registers. Instruction operands for the translated microinstructions are stored in the R-stage 116 registers for execution of the microinstructions by subsequent stages of the pipeline 100.

An A-stage 118, or address stage 118, includes address generation logic that receives operands and microinstructions from the R-stage 116 and generates addresses required by the microinstructions, such as memory addresses for load/store micro instructions.

A D-stage 122, or data stage 122, includes logic for accessing data specified by the addresses generated by the A-stage 118. In particular, the D-stage 122 includes a data cache for caching data within the processor 100 from a system memory. In one embodiment, the data cache is a two-cycle cache. The D-stage 122 provides the data cache data to an E-stage 126.

The E-stage 126, or execution stage 126, includes execution logic, such as arithmetic logic units, for executing the microinstructions based on the data and operands provided from previous stages. In particular, the E-stage 126 produces a resolved target address 156 of all branch instructions. That is, the E-stage 126 target address 156 is known to be the correct target address of all branch instructions with which all predicted target addresses must match. In addition, the E-stage 126 produces a resolved direction for all branch instructions, i.e., whether the branch is taken or not taken.

An S-stage 128, or store stage 128, performs a store to memory of the results of the microinstruction execution received from the E-stage 126. In addition, the target address 156 of branch instructions calculated in the E-stage 126 is provided to the instruction cache 202 in the I-stage 102 from the S-stage 128. Furthermore, the BTAC 216 of the I-stage 102 is updated from the S-stage 128 with the resolved target addresses of branch instructions executed by the pipeline 100 for caching in the BTAC 216. In addition, other speculative branch information (SBI) 236 (see FIG. 2) is updated in the BTAC 216 from the S-stage 128. The speculative branch information 236 includes the branch instruction length, the location within an instruction cache 202 line of the branch instruction, whether the branch instruction wraps over multiple instruction cache 202 lines, whether the branch is a call or return instruction, and information used to predict the direction of the branch instruction.

A W-stage 132, or write-back stage 132, writes back the result from the S-stage 128 into the R-stage 116 registers, thereby updating the processor 100 state.

The instruction buffer 142, F-stage instruction queue 144 and X-stage instruction queue 146, among other things, serve to minimize the impact of branches upon the clocks per instruction value of the processor 100.

Figure 2:
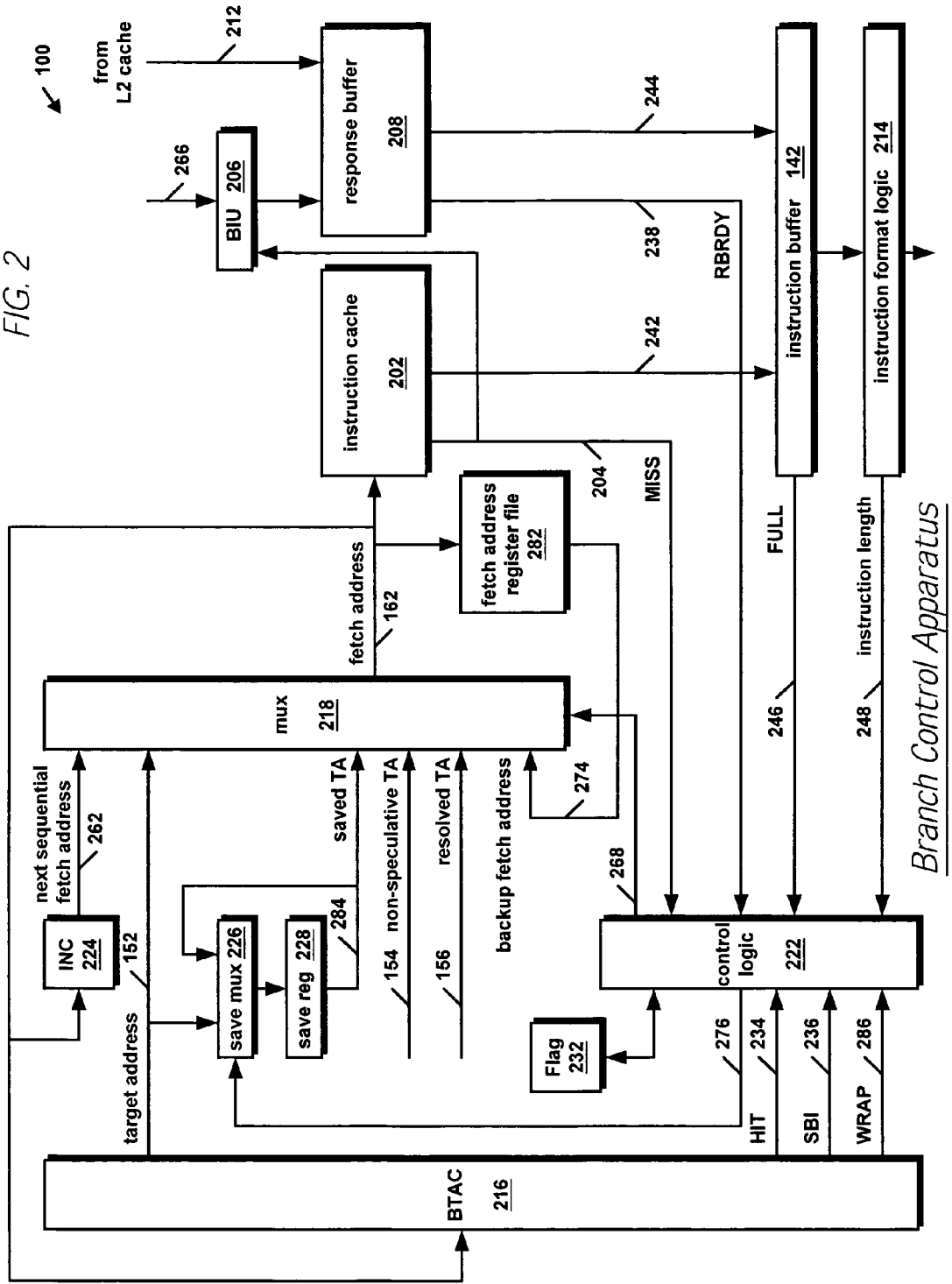
FIG. 2 is a block diagram of portions of the pipelined microprocessor of FIG. 1 including a branch control apparatus according to the present invention.

Referring now to FIG. 2, a block diagram of portions of the pipelined microprocessor 100 of FIG. 1 including a branch control apparatus according to the present invention is shown.

The microprocessor 100 includes an instruction cache 202 that caches instruction bytes. The instruction cache 202 comprises an array of cache lines for storing instruction bytes. The array of cache lines is indexed by a fetch address 162 of FIG. 1. That is, the fetch address 162 selects one of the cache lines in the array. The instruction cache 202 provides the selected cache line of instruction bytes to the instruction buffer 142 of FIG. 1 via a data bus 242.

In one embodiment, the instruction cache 202 comprises a 64 KB 4-way set associative cache, with 32-byte cache lines per way. In one embodiment, one half of the selected cache line of instruction bytes is provided by the instruction cache 202 at a time, i.e., 16 bytes are provided during two separate periods each. In one embodiment, the instruction cache 202 is similar to an instruction cache described in abandoned U.S. patent application Ser. No. 09/849,736, Patent Application Publication US2002/0194461 published Dec. 19, 2002, having a common assignee, and which is hereby incorporated by reference in its entirety for all purposes. The instruction cache 202 generates a true value on a MISS signal 204 if the fetch address 162 misses in the instruction cache 202.

The microprocessor 100 also includes a bus interface unit (BIU) 206 that fetches cache lines from a memory via a data bus 266. In particular, the BIU 206 fetches cache lines from the memory if the instruction cache 202 generates a true value on MISS signal 204. The instruction cache 202 also provides the MISS signal 204 to the BIU 206.

The microprocessor 100 also includes a response buffer 208. The response buffer 208 receives caches lines from the BIU 206. The response buffer 208 also receives cache lines from a level-2 cache via data bus 212. The response buffer 208 provides cache lines of instruction bytes to the instruction buffer 142 via a data bus 244. When the response buffer 208 has a cache line of instruction bytes to provide to the instruction buffer 142, the response buffer 208 generates a true value on an RBRDY signal 238.

When a cache line is stored into the instruction buffer 142, either from the instruction cache 202 or from the response buffer 208, such that the instruction buffer 142 becomes full, the instruction buffer 142 generates a true value on a FULL signal 246 to indicate that it cannot presently accept instruction bytes.

The microprocessor 100 also includes instruction format logic 214. The instruction format logic 214 receives instruction bytes from the instruction buffer 142. The instruction format logic 214 formats, or parses, the instruction bytes received into an instruction. In particular, the instruction format logic 214 determines the size in bytes of the instruction. The instruction format logic 214 provides the length of the currently formatted instruction via instruction length signal 248. The instruction format logic 214 provides the formatted instruction to the remainder of the microprocessor 100 pipeline for further decode and execution. In one embodiment, the instruction format logic 214 is capable of formatting multiple instructions per microprocessor 100 clock cycle.

The microprocessor 100 also includes a branch target address cache (BTAC) 216. The BTAC 216 also receives the instruction cache 202 fetch address 162. The BTAC 216 comprises an array of storage elements for caching fetch addresses of previously executed branch instructions and their associated branch target addresses. The storage elements also store other speculative branch information related to the branch instructions for which the target addresses are cached. In particular, the storage elements store an indication of whether the multi-byte branch instructions wrap across two instruction cache lines. The fetch address 162 indexes the array of storage elements in the BTAC 216 to select one of the storage elements.

The BTAC 216 outputs the target address 152 of FIG. 1 and speculative branch information (SBI) 236 from the storage element selected by the fetch address 162. In one embodiment, the SBI 236 includes the branch instruction length, the location of the branch instruction in the cache line, whether the branch is a call or return instruction, and a prediction of whether the branch instruction will be taken or not taken.

The BTAC 216 also outputs a HIT signal 234 that indicates whether the fetch address 162 hit in the BTAC 216. In one embodiment, the BTAC 216 is similar to a BTAC described in abandoned U.S. patent application Ser. No. 09/849,736, Patent Application Publication US2002/0194461 published Dec. 19, 2002, which is incorporated by reference above. In one embodiment, the BTAC 216 is a speculative BTAC because the microprocessor 100 branches to the target address 152 provided by the BTAC 216 before the instruction cache line provided by the instruction cache 202 is decoded to know whether or not a branch instruction is even present in the cache line selected by the fetch address. That is, the microprocessor 100 speculatively branches even though the possibility exists that no branch instruction is present in the cache line selected by the fetch address hitting in the BTAC 216.

The BTAC 216 also outputs a WRAP signal 286, which specifies whether the branch instruction wraps across two cache lines. The WRAP signal 286 value is cached in the BTAC 216 along with the branch instruction target address after execution of the branch instruction.

Figure 3:
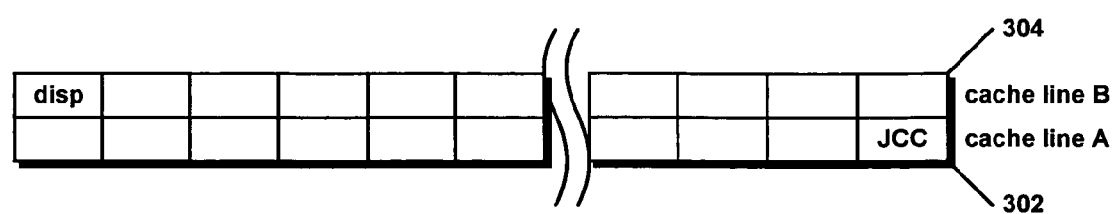
FIG. 3 is a table illustrating two cache lines containing a branch instruction that wraps across the two cache lines according to the present invention.

Referring now to FIG. 3, a table illustrating two cache lines containing a branch instruction that wraps across the two cache lines is shown. The table shows a first cache line, denoted cache line A 302 whose last instruction byte contains an opcode byte for an x86 JCC (conditional jump) instruction. The table also shows a second cache line, denoted cache line B 304 whose first instruction byte contains a signed displacement byte (disp) for the JCC instruction. Whenever the microprocessor 100 executes a branch instruction and caches the fetch address of the cache line containing the branch instruction in the BTAC 216 along with the target address of the branch instruction, the microprocessor 100 also caches an indicator of whether the branch instruction wraps across two cache lines, like the JCC instruction of FIG. 3. If the fetch address subsequently hits in the BTAC 216, the BTAC 216 provides the cached wrap indicator on the WRAP signal 286. The wrap indicator enables the branch control apparatus to know that the fetch address of both cache lines must be provided to the instruction cache 202 in order to obtain all the instruction bytes for the branch instruction.

Referring again to FIG. 2, the microprocessor 100 also includes control logic 222. The HIT signal 234, the SBI 236, the WRAP signal 286, the MISS signal 204, the FULL signal 246, the RBRDY signal 238, and the instruction length signal 248 are all provided as inputs to the control logic 222. The operation of the control logic 222 is described in more detail below.

The microprocessor 100 also includes a mux 218. The mux 218 receives at least six addresses as inputs and selects one of the inputs as the fetch address 162 to the instruction cache 202 in response to a control signal 168 generated by the control logic 222. The mux 218 receives the target address 152 from the BTAC 216. The mux 218 also receives a next sequential fetch address 262. The next sequential fetch address 262 is the previous fetch address incremented by the size of an instruction cache 202 cache line by an incrementer 224. The incrementer 224 receives the fetch address 162 and provides the next sequential fetch address 262 to the mux 218.

The mux 218 also receives the resolved target address 156 of FIG. 1. The resolved target address 156 is provided by execution logic in the microprocessor 100. The execution logic calculates the resolved target address 156 based execution of a branch instruction. If after branching to the target address 152 provided by the BTAC 216, the microprocessor 100 later determines that the branch was erroneous, the microprocessor 100 corrects the error by flushing the pipeline and branching to either the resolved target address 156 or to the fetch address of a cache line including the instruction following the branch instruction. In one embodiment, the microprocessor 100 corrects the error by flushing the pipeline and branching to the fetch address of a cache line including the branch instruction itself, if the microprocessor 100 determines that no branch instruction was present in the cache line as presumed. The error correction is as described in U.S. patent application Ser. No. 09/849,658, U.S. Pat. No. 7,134,005 issued Nov. 7, 2006, having a common assignee, and which is hereby incorporated by reference in its entirety for all purposes.

In one embodiment, the mux 218 also receives the non-speculative target address 154 of FIG. 1. The non-speculative target address 154 is generated by other branch prediction elements, such as a call/return stack and a branch target buffer (BTB) that caches target addresses of indirect branch instructions based on the branch instruction pointer. The mux 218 selectively overrides the target address 152 provided by the BTAC 216 with the non-speculative target address 154 as described in U.S. patent application Ser. No. 09/849,799, U.S. Pat. No. 7,165,169 issued Jan. 16, 2007, having a common assignee, and which is hereby incorporated by reference in its entirety for all purposes.

The mux 218 also receives a backup fetch address 274. The microprocessor 100 includes a fetch address register file 282 that provides the backup fetch address 274 to the mux 218. In one embodiment of the microprocessor 100, stages C 101 through V 108 cannot stall. That is, all of the state is not saved for these stages on each clock cycle. Consequently, if a cache line reaches the instruction buffer 142 and the instruction buffer 142 is full, the cache line is lost. If the instruction buffer 142 is relatively large, it may be advantageous to save complexity and space in the microprocessor 100 by not having the state saving logic.

Although the upper stages of the pipeline 100 may not stall, the fetch address of a cache line that is lost due to a full instruction buffer 142 is saved in the fetch address register file 282 and provided to the mux 218 as the backup fetch address 274. As cache lines flow down the pre-decode pipeline stages of the microprocessor 100, the corresponding fetch address 152, provided by the mux 218, flows down the fetch address register file 282. Use of the backup fetch address 274 will be described in more detail below with respect to the remaining figures.

The mux 218 also receives a saved target address 284. The saved target address 284 is a previous value of the target address 152 output by the BTAC 216. The saved target address 284 is saved in a save register 228. The save register 228 receives the output of a save mux 226. The save mux 226 receives the BTAC 216 target address 152. The save mux 226 also receives the output of the save register 228 for holding the value of the saved target address 284. The save mux 226 is controlled by a control signal 276 generated by the control logic 222.

The microprocessor 100 also includes a flag register 232. The control logic 222 sets the flag register 232 to a true value whenever a wrapped BTAC 216 branch instruction is pending. That is, the flag register 232 indicates that the save register 228 currently stores a BTAC 216 target address 152 for a branch instruction that wraps across two cache lines.

Figure 4:
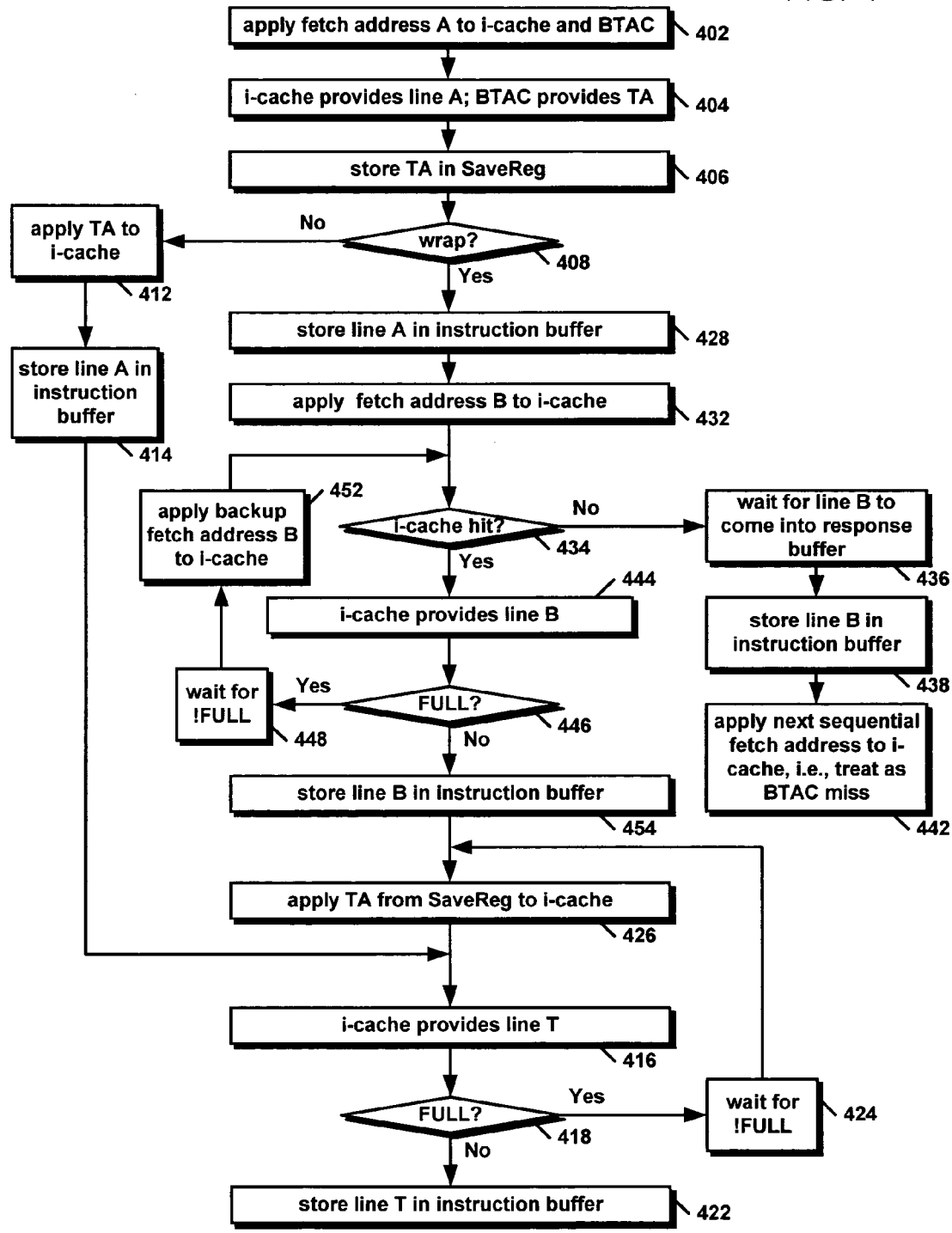
FIG. 4 is a flowchart illustrating operation of the branch control apparatus of FIG. 2 according to the present invention.

Referring now to FIG. 4, a flowchart illustrating operation of the branch control apparatus of FIG. 2 according to the present invention is shown. In the following description of FIG. 4, fetch address A refers to a fetch address of a cache line A that contains at least a first portion of a branch instruction, such as cache line A 302 of FIG. 3. Fetch address B refers to a fetch address of a cache line B that contains a second portion of a wrapping branch instruction, such as cache line B 304 of FIG. 3. Cache line T refers to a cache line that contains one or more target instructions of a branch instruction selected by a target address of the branch instruction. For clarity and simplicity, the flowchart of FIG. 4 assumes that both cache line A and cache line T hit in the instruction cache 202 of FIG. 2. The flowchart of FIG. 4 specifies operation if cache line B hits in the instruction cache 202 and specifies operation if cache line B does not hit in the instruction cache 202. Flow begins at block 402.

At block 402, mux 218 of FIG. 2 applies fetch address A as the fetch address 162 to the instruction cache 202 and to the BTAC 216 of FIG. 2. In the typical case, program flow proceeds sequentially, hence, mux 218 selects the next sequential fetch address 262 of FIG. 2 as fetch address A. Flow proceeds from block 402 to block 404.

At block 404, the instruction cache 202 provides line A on data bus 242 of FIG. 2 in response to the application of fetch address A during step 402. Line A contains at least a first portion of a branch instruction, and fetch address A is cached in the BTAC 216. Whether cache line A contains all or part of the branch instruction will be determined at decision block 408 described below. The BTAC 216 provides a target address 152 of FIG. 1 for the cached branch instruction in response to fetch address A. Flow proceeds from block 404 to block 406.

At block 406, the target address 152 provided by the BTAC 216 during step 404 is stored in the save register 228 of FIG. 2. That is, control logic 222 controls save mux 226 of FIG. 2 to select target address 152 from the BTAC 216 for storage in the save register 228 because a BTAC 216 hit occurred, as indicated on HIT signal 234 of FIG. 2. Upon storing the target address 152 into the save register 228, the control logic 222 sets the flag register 232 to a true value. Flow proceeds from block 406 to decision block 408.

At decision block 408, control logic 222 of FIG. 2 determines whether the branch instruction wraps beyond cache line A, i.e., across two cache lines. In particular, control logic 222 examines the WRAP signal 286 of FIG. 2 to determine if it has a true value. If not, then the branch instruction is wholly contained in cache line A, and flow proceeds to block 412. Otherwise, the first part of the branch instruction is contained in cache line A, the second part of the branch instruction is contained in cache line B, and flow proceeds to block 428.

At block 412, the target address 152 provided by the BTAC 216 during step 404 is selected by mux 218 and applied as fetch address 162 to the instruction cache 202. If flow reaches block 412, then the BTAC 216 branch instruction is not a wrapping branch instruction. Hence, the target address 152 is applied after fetch address A, since it would be incorrect to apply fetch address B to the instruction cache 202, since the entire branch instruction is contained in cache line A. Flow proceeds from block 412 to block 414.

At block 414, cache line A is stored in the instruction buffer 142 of FIG. 2. Flow proceeds from block 414 to block 416.

At block 416, the instruction cache 202 provides cache line T, which contains the target instructions of the branch instruction. The instruction cache 202 provides cache line T in response to the target address 152 applied to the instruction cache 202 during step 412. Flow proceeds from block 416 to decision block 418.

At decision block 418, control logic 222 determines whether the instruction buffer 142 is full. In particular, the control logic 222 examines the value of the FULL signal 246 of FIG. 2 generated by the instruction buffer 142 to see if it is true. If not, flow proceeds to block 422. Otherwise, flow proceeds to block 424.

At block 422, cache line T is stored in the instruction buffer 142. At this point, the branch instruction and its target instructions are stored in the instruction buffer 142 so that they can be formatted by the instruction format logic 214 of FIG. 2. Upon storing cache line T into the instruction buffer 142, the control logic 222 sets the flag register 232 to a false value. If the branch instruction was a non-wrapping branch, i.e., if flow proceeded from decision block 408 to block 412, then the instruction buffer 142 contains a cache line A containing the entire branch instruction, and cache line T, containing the target instructions. However, if the branch instruction was a wrapping branch, i.e., if flow proceeded from decision block 408 to block 428, then the instruction buffer 142 will contain cache line A containing the first portion of the branch instruction, cache line B, containing the second portion of the branch instruction, and cache line T, containing the target instructions, as described below. Flow ends at block 422.

At block 424, control logic 222 waits for the instruction buffer 142 to become not full. That is, control logic 222 examines the FULL signal 246 until it becomes false. While the control logic 222 is waiting for the FULL signal 246 to become false, the saved target address 284 continues to be held in the save register 228. Flow proceeds from block 424 to block 426.

At block 426, mux 218 selects the saved target address 284 provided by the save register 228 and applies the save target address 284 as fetch address 162 to the instruction cache 202. The saved target address 284 was stored in the save register 228 during step 406. If flow reaches block 426 from block 454 described below, then the BTAC 216 branch instruction is a wrapping branch instruction. In this case, the target address 152 is applied after fetch address B so that the entire branch instruction is stored in the instruction buffer 142 prior to the branch target instructions in cache line T being stored in the instruction buffer 142. Flow proceeds from block 426 to block 416.

At block 428, cache line A is stored in the instruction buffer 142. In this case, cache line A contains only the first portion of the wrapping branch instruction, not the entire branch instruction. Flow proceeds from block 428 to block 432.

At block 432, mux 218 selects the next sequential fetch address 262 provided by the incrementer 224 of FIG. 2, which will be fetch address B, and applies fetch address B as the fetch address 162 to the instruction cache 202. It is necessary to apply fetch address B in order to obtain cache line B, which contains the second portion of the wrapping branch instruction, so that all the instruction bytes of the branch instruction may be stored in the instruction buffer for decoding. Flow proceeds from block 432 to decision block 434.

At decision block 434, control logic 222 and BIU 206 of FIG. 2 determine whether fetch address B hit in the instruction cache 202. In particular, control logic 222 and bus BIU 206 examine the MISS signal 204 of FIG. 2 generated by the instruction cache 202 to determine if the value is true. If not, flow proceeds to block 436. Otherwise, flow proceeds to block 444.

At block 436, either the BIU 206 fetches cache line B from memory, or cache line B is provided by the level-2 cache. When cache line B arrives in response buffer 208 of FIG. 2, the response buffer 208 generates a true value on the RBRDY signal 238 to notify control logic 222 that cache line B is available. Flow proceeds from block 436 to block 438.

At block 438, cache line B is stored in the instruction buffer 142 from the response buffer 208. Flow proceeds from block 438 to block 442.

At block 442, mux 218 selects the next sequential fetch address 262 provided by the incrementer 224 and applies the next sequential fetch address as the fetch address 162 to the instruction cache 202. That is, if cache line B is not present in the instruction cache 202, this condition is treated as a BTAC 216 miss. If the E-stage 126 of FIG. 1 later determines that the branch instruction is taken, the misprediction will be corrected by branching to the resolved target address 156. The embodiment of FIG. 4 has the advantage of requiring less control logic than the embodiment of FIG. 8, described below, which handles the case of a wrapping BTAC 216 branch, whose second cache line misses in the instruction cache 202. In a microprocessor 100 in which the probability is very low that a branch instruction will wrap and generate an instruction cache 202 miss for its second portion, the embodiment of FIG. 4 is advantageous because it requires less complexity. Flow ends at block 442.

At block 444, the instruction cache 202 provides cache line B on data bus 242 in response to the application of fetch address B during step 432. Line B contains the second portion of the branch instruction. Flow proceeds from block 444 to decision block 446.

At decision block 446, control logic 222 determines whether the instruction buffer 142 is full by examining the value of the FULL signal 246 to see if it is true. That is, the control logic 222 determines whether the store of cache line A into the instruction buffer 142 during step 428 filled the instruction buffer 142. If so, flow proceeds to block 448. If not, flow proceeds to block 454.

At block 448, control logic 222 waits for the instruction buffer 142 to become not full. That is, control logic 222 examines the FULL signal 246 until it becomes false. Flow proceeds from block 448 to block 452.

At block 452 mux 218 selects the backup fetch address 274 of FIG. 2 provided by the fetch address register file 282 of FIG. 2, which will be fetch address B, and applies fetch address B as the fetch address 162 to the instruction cache 202. It is necessary to apply fetch address B in order to obtain cache line B, which contains the second portion of the wrapping branch instruction. Flow proceeds from block 452 to block 434 to determine whether the application of the backup fetch address B hits in the instruction cache 202.

At block 454, cache line B is stored in the instruction buffer 142. Cache line B contains the second portion of the wrapping branch instruction. Flow proceeds from block 454 to block 426 to get cache line T, which contains the branch target instructions, into the instruction buffer 142.

As may be seen from the flowchart of FIG. 4, the present invention provides an improvement over a solution to the wrapping BTAC 216 branch problem that simply treats all wrapping BTAC 216 branches as BTAC 216 misses. The percentage of BTAC 216 branches that wrap is non-negligible, and the present invention provides a means of branching rather than not branching and having to correct, thereby potentially saving many clock cycles. This is particularly beneficial in a microprocessor 100 in which the number of stages is relatively large.

Figure 5:
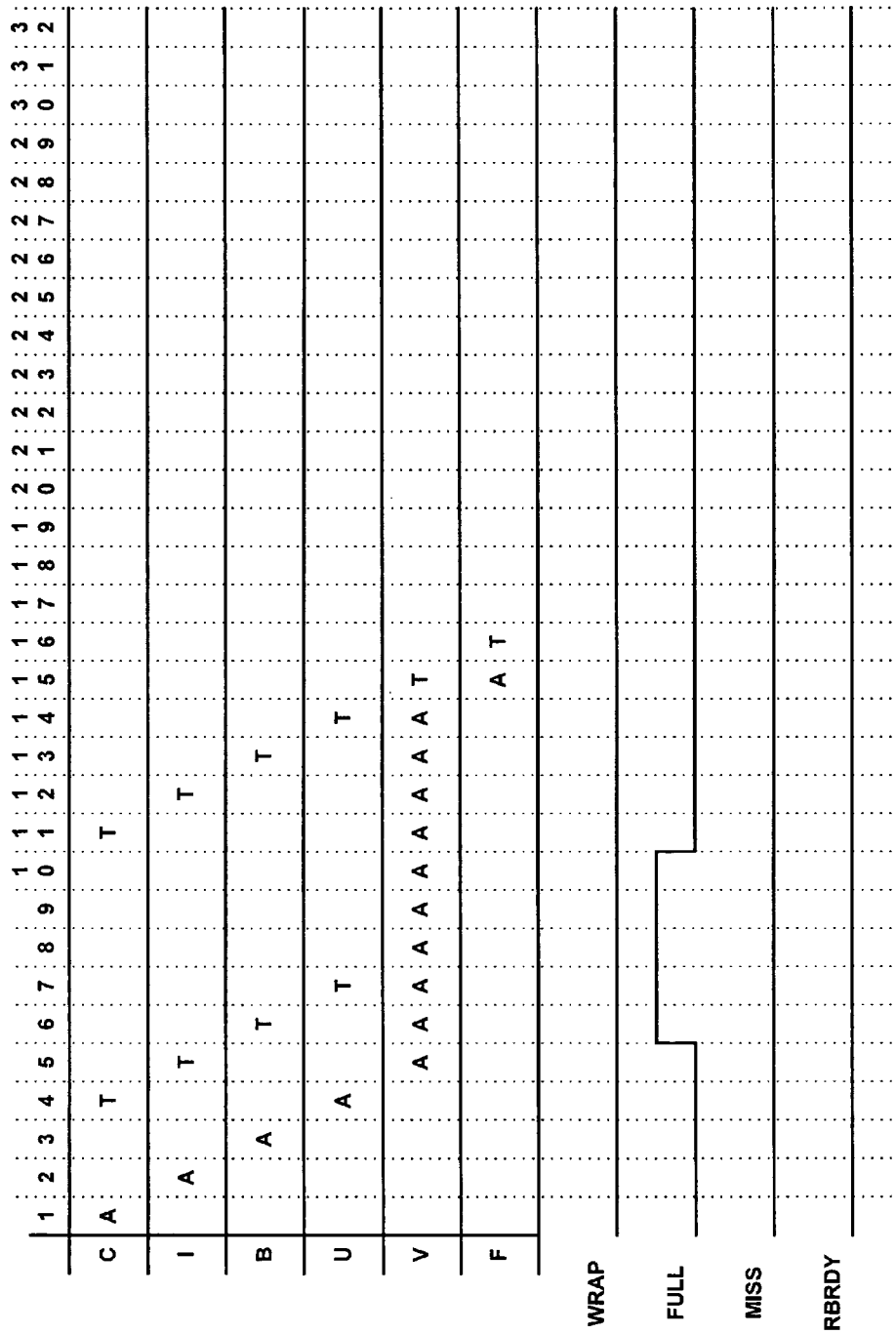
FIGS. 5, 6, and 7 are timing diagrams illustrating examples of operation of the branch control apparatus of FIG. 2 according to the flowchart of FIG. 4 according to the present invention.
Figure 6:
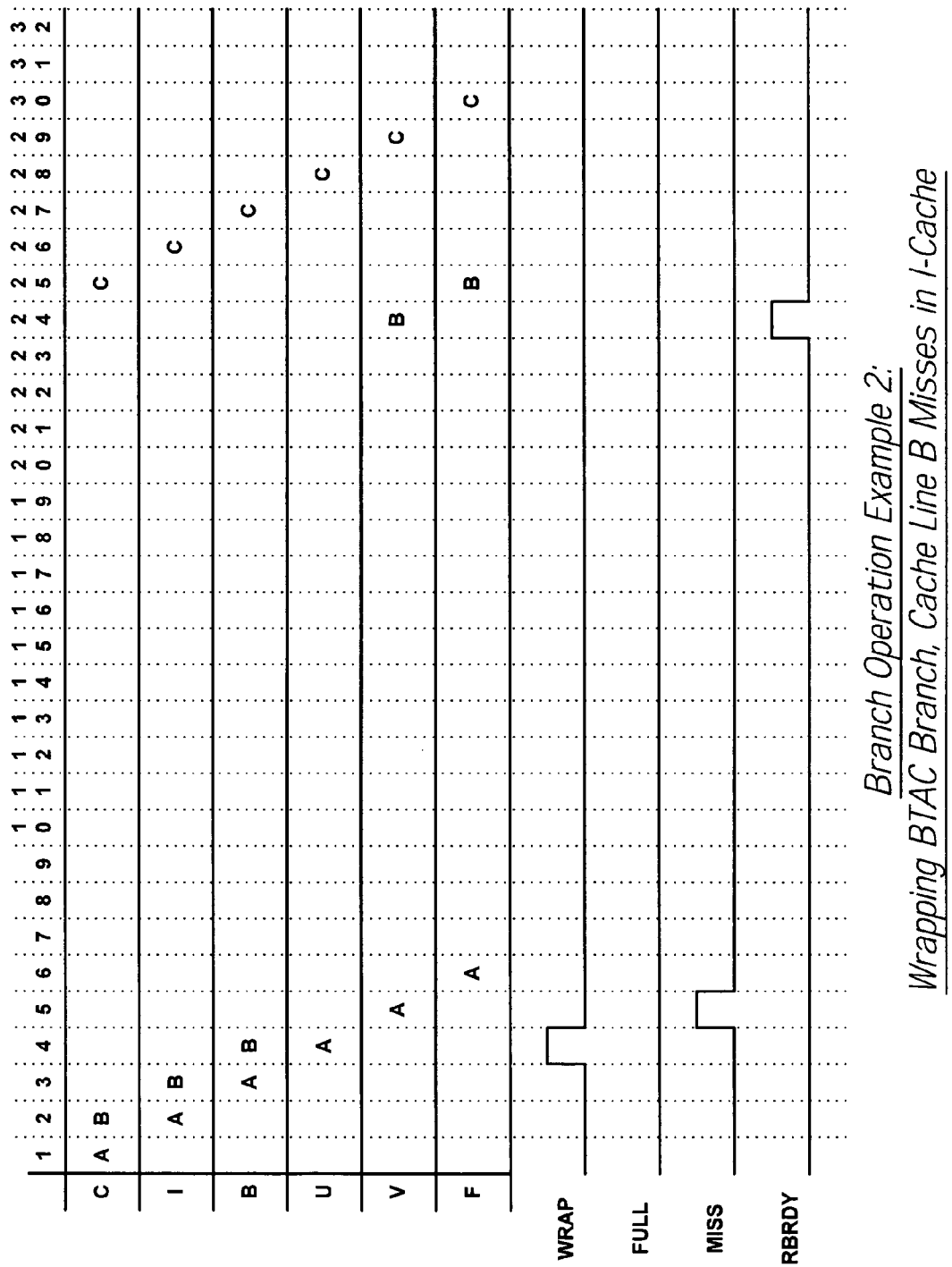
Figure 7:
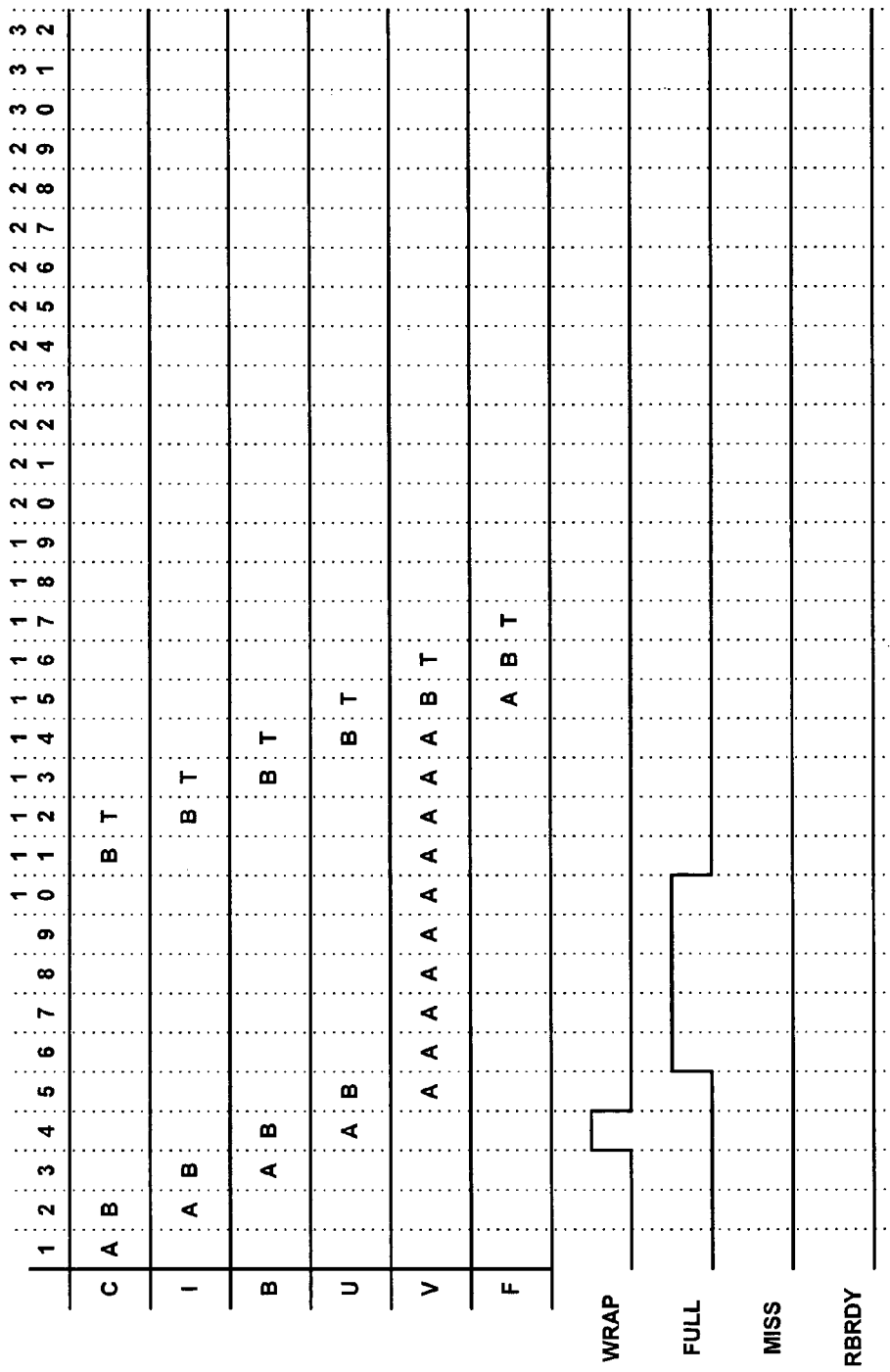

Referring now generally to FIGS. 5, 6, 7, and 9, timing diagrams illustrating examples of operation of the branch control apparatus of FIG. 2 according to the present invention are shown. FIGS. 5, 6, and 7 illustrate operation according to the flowchart of FIG. 4, whereas, FIG. 9 illustrates operation according to the alternate embodiment flowchart of FIG. 8 described below. The timing diagrams comprise a matrix of cells having 7 rows and 33 columns. The first column, beginning with the second row, is denoted C, I, B, U, V, and F, corresponding to the C-stage 101, I-stage 102, B-stage 104, U-stage 106, V-stage 108, and F-stage 112 of FIG. 1. The first row, beginning with the second column, is denoted 1 through 32, corresponding to 32 clock cycles of the microprocessor 100.

Each of the cells in the matrix specifies the contents of the specified stage during the specified clock cycle. For clarity and simplicity, each of the cells is denoted herein as (s,c), where s is the stage, and c is the clock cycle. For example, cell (V,5) denotes the contents of the V-stage 108 during clock cycle 5. The cells are either blank, or have one of four letters A, B, C, or T in them. The letter A designates either fetch address A or cache line A, of FIG. 4, or both depending upon the context of the stage. Similarly, the letter B designates either fetch address B or cache line B, of FIG. 4, or both, and the letter T designates either a BTAC 216 target address of a branch instruction or cache line T, of FIG. 4, or both. The letter C designates either the next sequential fetch address after fetch address B or the next sequential cache line after cache line B or both. For example, in FIG. 5, the cell corresponding to the contents of the I-stage 102 during clock cycle 2, denoted (I,2), contains an A, to signify that the I-stage 102 receives fetch address A during clock cycle 2. That is, address A is applied as the fetch address 162 of FIG. 1 to the instruction cache 202 of FIG. 2 as described with respect to block 402 of FIG. 4.

In addition, below the matrix, the values of the WRAP signal 286, the FULL signal 246, the MISS signal 204, and RBRDY signal 238 of FIG. 2 during each of the 32 clock cycles is shown. A polarity convention is chosen for illustration purposes such that if the signal is low, then the value is false. For example, if the FULL signal 246 is low, the value is false, i.e., the instruction buffer 142 of FIG. 1 is not full; conversely, if the FULL signal 246 is high, the value is true, i.e., the instruction buffer 142 of FIG. 1 is full. However, the invention is susceptible to use of either polarity convention. References to block numbers, such as block 412, are to blocks of the flowchart of FIG. 4.

Referring now to FIG. 5, a timing diagram is shown illustrating an example of operation of the microprocessor 100 of FIG. 1 according to the flowchart of FIG. 4 in the case of a non-wrapping BTAC 216 branch, wherein the instruction buffer 142 is full when cache line T is initially ready for storage in the instruction buffer 142. Hence, the WRAP signal 286, the MISS signal 204, and the RBRDY signal 238 are false throughout the clock cycles of FIG. 5, and the FULL signal 246 is true during a portion of the clock cycles, in particular clock cycles 6 through 10.

In cell (C,1), mux 218 of FIG. 2 selects fetch address A as fetch address 162. In cell (I,2), the I-stage 102 applies fetch address A to the instruction cache 202 and to the BTAC 216, according to block 402. In cell (B,3), the instruction cache 202 is selecting cache line A, during its second access cycle. In cell (U,4), the instruction cache 202 provides cache line A, according to block 404.

In cell (V,5), cache line A is written to the instruction buffer 142, according to block 414. In the example of FIG. 5, storing cache line A in the instruction buffer 142 causes the instruction buffer 142 to be full. Hence, during clock 6, the FULL signal 246 is true. In the example of FIG. 5, the FULL signal 246 remains true until clock 11.

In cell (C,4), mux 218 selects the target address 152 provided by the BTAC 216 during block 404 as the fetch address 162. In cell (I,5), the target address 152 is applied to the instruction cache 202, according to block 412, since the WRAP signal 286 is false in the example.

In cells (V,6) through (V,14), cache line A remains in the instruction buffer 142 and is not provided to the instruction format logic 214 because the instruction format logic 214 is formatting other instructions ahead of cache line A. An example of a cause of the instruction buffer 142 remaining full for several clock cycles is where one or more instructions which require a large number of clock cycles to execute, such as floating point divides, are being executed in the pipeline. These instructions cause the stages of the pipeline 100 above the execution stage 126 to stall.

In cell (B,6), the instruction cache 202 is selecting cache line T, during its second access cycle. In cell (U,7), the instruction cache 202 provides cache line T, according to block 416. However, during clock cycle 7 the instruction buffer 142 is full, as determined during block 418. Hence, during clock cycle 8, cache line T is lost since the instruction buffer 142 cannot accept cache line T since the instruction buffer 142 is full. Control logic 222 of FIG. 2 waits until the FULL signal 246 is false, according to block 424.

In cell (C,11), mux 218 selects the saved target address 284 provided by the save register 228 as the fetch address 162, since the control logic 222 determined that the FULL signal 246 is now false in clock cycle 11. In cell (I,12), the saved target address 284 is applied to the instruction cache 202, according to block 426. In cell (B,13), the instruction cache 202 is selecting cache line T, during its second access cycle. In cell (U,14), the instruction cache 202 provides cache line T, according to block 416.

In cell (F,15), cache line A proceeds to the instruction format logic 114 where the branch instruction is formatted. In cell (V,15), cache line T is written to the instruction buffer 142, according to block 422, since the instruction buffer 142 is no longer full, as determined during block 418. In cell (F,16), cache line T proceeds to the instruction format logic 114 where the branch target instruction is formatted.

Referring now to FIG. 6, a timing diagram, similar to FIG. 5, illustrating a second example of operation of the branch control apparatus of FIG. 2 according to the flowchart of FIG. 4 according to the present invention is shown. FIG. 6 illustrates an example of operation of the microprocessor 100 of FIG. 1 according to the flowchart of FIG. 4 in the case of a wrapping BTAC 216 branch, wherein the second portion of the branch instruction, contained in cache line B, misses in the instruction cache 102. Hence, the FULL signal 246 is false throughout the clock cycles of FIG. 6, and the WRAP signal 286, the MISS signal 204, and the RBRDY signal 238 are true during a portion of the clock cycles, in particular during clock cycles 4, 5, and 24, respectively.

Cells (C,1), (I,2), (B,3), (U,4), and (V,5) are similar to corresponding cells of FIG. 5, with fetch address A and cache line A proceeding down the upper stages of the microprocessor 100 pipeline. During clock cycle 4, the WRAP signal 286 is true, specifying that the BTAC 216 indicated the branch instruction wraps across cache lines A and B. In cell (F,6), cache line A proceeds to the F-stage 112.

In cell (C,2), mux 218 selects the next sequential fetch address 262, which is fetch address B, as the fetch address 162 since the control logic 222 determined that the branch instruction is a wrapping BTAC 216 branch, according to block 408. In cell (I,3), fetch address B is applied to the instruction cache 202, according to block 432, since the WRAP signal 286 is true in the example. In cell (B,4), the instruction cache 202 is selecting cache line B, during its second access cycle. However, during clock 5, the instruction cache 102 determines that fetch address B is a miss, and accordingly asserts the MISS signal 204. Consequently, the instruction cache 102 is unable to provide cache line B.

During clock cycles 7 through 23, the microprocessor 100 waits for cache line B to be fetched from memory into the response buffer 208, according to block 436. During clock 24, the response buffer 208 of FIG. 2 asserts the RBRDY signal 238 when cache line B arrives. In cell (V,24), cache line B is stored into the instruction buffer 142 from the response buffer 208, according to block 438. In cell (F,25), cache line B proceeds to the F-stage 112.

In cell (C,25), mux 218 selects the next sequential fetch address 262, which is fetch address C, as the fetch address 162, according to block 442, since the control logic 222 determined that cache line B missed in the instruction cache 102. Hence, the microprocessor 100 treats the case of FIG. 6 as a BTAC 216 miss by not branching to the target address 132 provided by the BTAC 216, but instead fetching the next sequential instruction. In cell (I,26), the I-stage 102 applies fetch address C to the instruction cache 202. In cell (B,27), the instruction cache 202 is selecting cache line C, during its second access cycle. In cell (U,28), the instruction cache 202 provides cache line C. In cell (V,29), cache line C is written to the instruction buffer 142. In cell (F,30), cache line C proceeds to the F-stage 112.

Referring now to FIG. 7, a timing diagram, similar to FIG. 5, illustrating a third example of operation of the branch control apparatus of FIG. 2 according to the flowchart of FIG. 4 according to the present invention is shown. FIG. 7 illustrates an example of operation of the microprocessor 100 of FIG. 1 according to the flowchart of FIG. 4 in the case of a wrapping BTAC 216 branch, wherein cache line A fills the instruction buffer 142. Hence, the MISS signal 204 and the RBRDY signal 238 are false throughout the clock cycles of FIG. 5, and the WRAP signal 286 and the FULL signal 246 is true during a portion of the clock cycles. In particular, the WRAP signal 286 is true during clock cycle 4, and the FULL signal 246 is true during clock cycles 6 through 10.

Cells (C,1), (I,2), (B,3), (U,4), (V,5) through (V,14), and (F,15) are similar to corresponding cells of FIG. 5, with fetch address A and cache line A proceeding down the upper stages of the microprocessor 100 pipeline to the F-stage 112. During clock cycle 4, the WRAP signal 286 is true, specifying that the BTAC 216 indicated the branch instruction wraps across cache lines A and B.

Cells (C,2), (I,3), and (B,4) are similar to corresponding cells of FIG. 6, with fetch address B and cache line B proceeding down the C, I, and B stages of the microprocessor 100 pipeline. In cell (U,5), the instruction cache 102 provides cache line B, according to block 444, since fetch address B hit in the instruction cache 102.

However, during clock 6, the instruction buffer 142 asserts the FULL signal 246 because cache line A has filled the instruction buffer 142. Consequently, the control logic 222 waits for the FULL signal 246 signal to become false, according to block 448, which occurs in clock cycle 11.

In cell (C,11), mux 218 selects the backup fetch address 274 from the fetch address register file 282, which is fetch address B, in response to the FULL signal 246 becoming false. In cell (I,12), fetch address B is applied to the instruction cache 102, according to block 452. In cell (B,13), the instruction cache 202 is selecting cache line B, during its second access cycle. In cell (U,14), the instruction cache 202 provides cache line B, according to block 444, since fetch address B hits in the instruction cache 102. In cell (V,15), cache line B is written to the instruction buffer 142, according to block 454, since the instruction buffer 142 is not full. In cell (F,16), cache line B progresses to the F-stage 112.

In cell (C,12), mux 218 selects the saved target address 284 from save register 228. In cell (I,13), the saved target address 284 is applied to the instruction cache 102, according to block 426. In cell (B,14), the instruction cache 202 is selecting cache line T, during its second access cycle. In cell (U,15), the instruction cache 202 provides cache line T, according to block 416. In cell (V,16), cache line T is written to the instruction buffer 142, according to block 422, since the instruction buffer 142 is not full. In cell (F,17), cache line T progresses to the F-stage 112.

Figure 8:
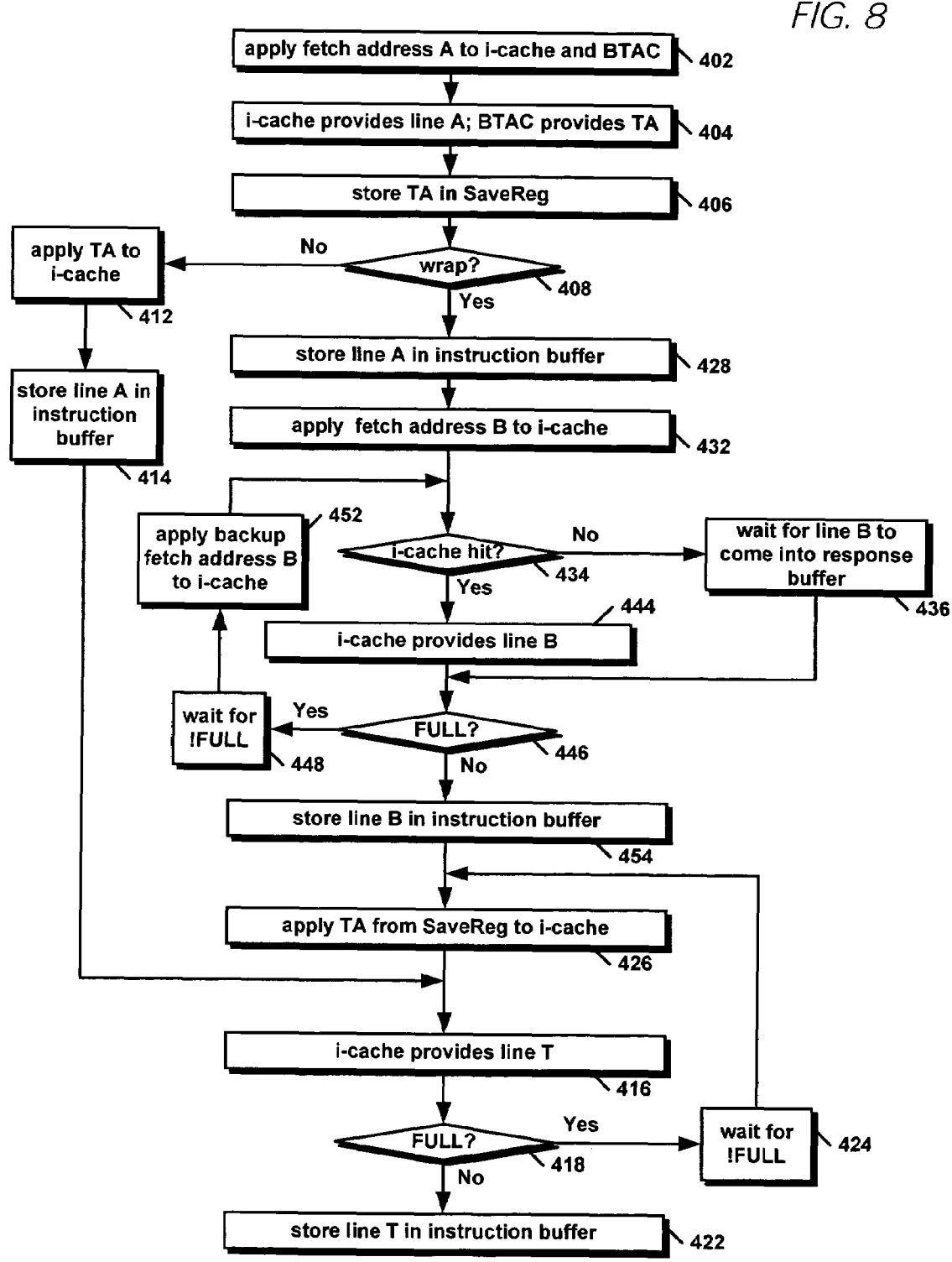
FIG. 8 is a flowchart illustrating operation of the branch control apparatus of FIG. 2 according to an alternate embodiment of the present invention.

Referring now to FIG. 8, a flowchart illustrating operation of the branch control apparatus of FIG. 2 according to an alternate embodiment of the present invention is shown. The flowchart of FIG. 8 is identical to the flowchart of FIG. 4 with the exception that FIG. 8 does not include blocks 438 and 442. Instead, flow proceeds from block 436 to decision block 446. That is, rather than treating a miss of fetch address B in the instruction cache 102 as a BTAC 216 miss, the embodiment of FIG. 8 handles the condition. The embodiment handles the condition by backing up to fetch address B after the instruction buffer 142 is no longer full, and subsequently applying the saved target address 284 to obtain cache line T, as will be illustrated with respect to FIG. 9.

Referring now to FIG. 9, a timing diagram, similar to FIG. 6, illustrating an example of operation of the branch control apparatus of FIG. 2 according to the flowchart of FIG. 8 according to the present invention is shown. FIG. 9 illustrates an example of operation of the microprocessor 100 of FIG. 1 according to the flowchart of FIG. 8 in the case of a wrapping BTAC 216 branch, wherein cache line B, which contains the second portion of the branch instruction, misses in the instruction cache 102, and cache line A fills the instruction buffer 142. Clock cycles 1 through 23 of FIG. 9 are the same as corresponding ones of FIG. 6, except that the FULL signal 246 is true during clock cycles 6 through 25 in FIG. 9.

When cache line B arrives in the response buffer 208 during clock cycle 24, the instruction buffer 142 is full, as determined according to block 446. Hence, cache line B is not written into the instruction buffer 142, but is written into the instruction cache 102.

In the example, the FULL signal 246 goes false during clock cycle 26, as determined during block 448. Hence, in cell (C,26), mux 218 selects backup fetch address 274 as fetch address 152. In cell (I,27), the backup fetch address 274 is applied to the instruction cache 102, according to block 452. In cell (B,28), the instruction cache 202 is selecting cache line B, during its second access cycle. In cell (U,29), the instruction cache 202 provides cache line B, according to block 444. Cache line B was previously written into the instruction cache 102 from the response buffer 208, during clock cycle 25. In cell (V,30), cache line B is written to the instruction buffer 142, according to block 454, since the instruction buffer 142 is not full. In cell (F,31), cache line B progresses to the F-stage 112.

In cell (C,27), mux 218 selects the saved target address 284 as fetch address 152. In cell (I,28), the saved target address 284 is applied to the instruction cache 102, according to block 426. In cell (B,29), the instruction cache 202 is selecting cache line T, during its second access cycle. In cell (U,30), the instruction cache 202 provides cache line T, according to block 416. In cell (V,31), cache line T is written to the instruction buffer 142, according to block 422, since the instruction buffer 142 is not full. In cell (F,32), cache line T progresses to the F-stage 112.

As may be observed from FIGS. 8 and 9, the alternate embodiment has the advantage of not incurring the additional clock cycles associated with correcting a mispredicted taken branch, i.e., a BTAC 216 hit that is treated as a BTAC 216 miss because it wraps and the second cache line containing the second part of the branch misses in the instruction cache 202. Rather, as may be observed from FIG. 9, the BTAC 216 target address 152 is supplied to the instruction cache 202 at the earliest clock cycle possible after fetch address B.

Although the present invention and its objects, features, and advantages have been described in detail, other embodiments are encompassed by the invention. For example, the number and arrangement of stages in the pipeline may vary. The size and construction of the BTAC, instruction cache, or instruction buffer may vary. The size of a cache line may vary.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A branch control apparatus in a microprocessor having an instruction cache, coupled to an address bus, for providing cache lines to an instruction buffer, the apparatus comprising:
   a target address of a branch instruction, said target address provided by a branch target address cache (BTAC);
   a wrap signal, originating directly from said BTAC, for indicating whether said branch instruction wraps across first and second cache lines of said instruction cache; and
   an address register, coupled to said BTAC, for storing said target address;
   wherein if said wrap signal indicates said branch instruction wraps across said first and second cache lines, said address register provides said target address on the address bus to the instruction cache to select a third cache line, said third cache line containing a target instruction of said branch instruction.

2. The branch control apparatus of claim 1, wherein said address register provides said target address on the address bus after a fetch address for said second cache line is provided on the address bus.

3. The branch control apparatus of claim 2, wherein said BTAC is coupled to the address bus, wherein said BTAC provides said target address in response to a fetch address provided on the address bus.

4. The branch control apparatus of claim 3, wherein said BTAC provides said target address in response to a fetch address of said first cache line.

5. The branch control apparatus of claim 4, wherein said first cache line contains a first portion of said branch instruction.

6. A pipelined microprocessor, comprising:
   an instruction cache, coupled to an address bus configured to receive a first fetch address for selecting a first cache line;
   a branch target address cache (BTAC), coupled to said address bus, for storing and directly providing a wrap indicator for indicating whether a branch instruction wraps beyond said first cache line;
   an address register, coupled to said BTAC, for storing a target address of said branch instruction, said target address provided by said BTAC; and
   a multiplexer, coupled to receive said target address from said address register and coupled to receive a second fetch address that specifies a second cache line containing a portion of said branch instruction wrapping beyond said first cache line, wherein if said wrap indicator is true, said multiplexer selects said second fetch address for provision onto said address bus and subsequently
   selects said target address from said address register for provision onto said address bus, after selecting said second fetch address for provision onto said address bus.

7. The pipelined microprocessor of claim 6, wherein said multiplexer selects said second fetch address after selecting said first fetch address.

8. The pipelined microprocessor of claim 6, wherein said BTAC provides said target address in response to said first fetch address received on said address bus.

9. The pipelined microprocessor of claim 6, wherein said second fetch address is a next sequential fetch address to said first fetch address.

10. The pipelined microprocessor of claim 6, wherein said multiplexer selects said target address for selecting a third cache line in said instruction cache, said third cache line containing a target instruction of said branch instruction.

11. The pipelined microprocessor of claim 10, wherein said multiplexer selects said first fetch address, said second fetch address and said target address for causing said first, second and third cache lines to be stored in order in an instruction buffer.

12. A branch control apparatus in a microprocessor, comprising:
   a branch target address cache (BTAC), for caching indications of whether previously executed branch instructions wrap across two cache lines and for directly providing said indications;
   a register, coupled to said BTAC, for receiving from said BTAC a target address of one of said previously executed instructions stored therein; and
   control logic, coupled to said BTAC, for receiving one of said indications associated with said one of said previously executed branch instructions;
   wherein if said one of said indications indicates said one of said previously executed branch instructions wraps across two cache lines, said control logic causes the microprocessor to branch to said target address, after causing said two cache lines containing said one of said previously executed branch instructions to be fetched.

13. The branch control apparatus of claim 12, wherein said control logic is configured to cause a first of said two cache lines containing a portion of said one of said previously executed branch instructions to be fetched from an instruction cache.

14. The branch control apparatus of claim 13, wherein said control logic is configured to receive a miss indicator from said instruction cache.

15. A microprocessor branch control apparatus, comprising:
   an incrementer, coupled to an instruction cache address bus, for providing a first fetch address on said address bus, said first fetch address selecting a first cache line containing a first portion of a branch instruction;
   a branch target address cache (BTAC), coupled to said address bus, for providing a target address of said branch instruction in response to said first fetch address, and for caching and directly providing an indication of whether said branch instruction wraps beyond said first cache line; and
   an address register, coupled to said BTAC, for storing said target address if said BTAC indicates said branch instruction wraps beyond said first cache line;
   wherein said incrementer provides a second fetch address on said address bus, said second fetch address selecting a second cache line containing a second portion of said branch instruction;
   wherein said address register provides said target address on said address bus, said target address selecting a third cache line containing a target instruction of said branch instruction.

16. The microprocessor branch control apparatus of claim 15, further comprising:
   a flag register, for storing an indication that said address register stores said target address of said branch instruction that wraps beyond said first cache line.

17. A method for performing branches in a microprocessor with an instruction cache, the method comprising:
   storing in a branch target address cache an indication of whether a previously executed branch instruction wraps beyond a first cache line containing at least a portion of said branch instruction, and said branch target address cache directly providing the indication;
   applying a first fetch address to the instruction cache for selecting said first cache line containing at least a portion of a branch instruction, after said storing said indication;
   providing a target address of said branch instruction and said indication in response to said first fetch address;
   determining whether said branch instruction wraps beyond said first cache line based on said indication;
   storing said target address in a register if said branch instruction wraps beyond said first cache line;
   applying a second fetch address to the instruction cache, if said branch instruction wraps beyond said first cache line, for selecting a second cache line containing a remainder of said branch instruction; and
   providing said target address from said register to the instruction cache for selecting a third cache line containing a target instruction of said branch instruction.

18. The method of claim 17, further comprising:
   determining whether said second fetch address misses in said instruction cache.

19. The method of claim 17, further comprising: storing said first, second and third cache lines in an instruction buffer.

20. The method of claim 19, wherein said storing said first, second and third cache lines in said instruction buffer comprises storing said first, second and third cache lines in said instruction buffer in order.

* * * * *